United States Patent
Otte et al.

(10) Patent No.: US 7,834,944 B2
(45) Date of Patent: Nov. 16, 2010

(54) METHOD FOR THE ORIENTATION OF A PARALLAX BARRIER SCREEN ON A DISPLAY SCREEN

(75) Inventors: Stephan Otte, Jena (DE); Jens Meichsner, Jena (DE)

(73) Assignee: Wise Vision Holdings Limited, Causeway Bay (HK)

( * ) Notice: Subject to any disclaimer, the term of this patent is extended or adjusted under 35 U.S.C. 154(b) by 0 days.

(21) Appl. No.: 12/632,341

(22) Filed: Dec. 7, 2009

(65) Prior Publication Data

US 2010/0103334 A1 Apr. 29, 2010

Related U.S. Application Data

(63) Continuation of application No. PCT/DE2007/002135, filed on Nov. 26, 2007.

(30) Foreign Application Priority Data

Jun. 7, 2007 (DE) ....................... 10 2007 026 628

(51) Int. Cl.
*G02F 1/1335* (2006.01)
(52) U.S. Cl. .............................. 349/15; 359/462; 353/7
(58) Field of Classification Search ................... 349/15; 359/462; 348/51; 353/6, 7; 352/57
See application file for complete search history.

(56) References Cited

U.S. PATENT DOCUMENTS

2004/0008251 A1 1/2004 Mashitani et al.
2004/0263970 A1 12/2004 McKee, Jr.
2006/0050382 A1 3/2006 Jahrmarkt et al.
2006/0051109 A1 3/2006 Lim et al.

FOREIGN PATENT DOCUMENTS

| DE | 100 03 326 A1 | 8/2001 |
|---|---|---|
| DE | 102 52 830 B3 | 5/2004 |
| GB | 190418672 | 10/1904 |
| JP | 8331605 | 12/1996 |
| WO | WO 2004/077839 A1 | 9/2004 |

OTHER PUBLICATIONS

Sam H. Kaplan: "Theory of Parallax Barriers", Journal of SMPTE, vol. 59, No. 7, pp. 11-21, Jul. 1952.

*Primary Examiner*—Thoi V Duong
(74) *Attorney, Agent, or Firm*—Muncy, Geissler, Olds & Lowe, PLLC

(57) ABSTRACT

A method for the orientation of a parallax barrier screen on a display screen with pixels x(ij) in a pattern of rows (i) and columns (j) for the production of a display screen for three-dimensional representation. Particularly, a test image is presented comprising various views A(k) where k=1, ..., n and n=6 or n=7, wherein the test image comprises at least two first straight lines having two different directions of extension from one another, said lines being disposed in different horizontal positions in the n=6 or n=7 views A(k), wherein the test image comprises at least two second straight lines that are each oriented parallel to one of the first straight lines and that are disposed at least at the same horizontal positions in the n=6 or n=7 views A(k). The method according to the invention may be performed quickly and with a high degree of accuracy and is therefore suitable for industrial use for the production of display screens for three-dimensional representation.

21 Claims, 6 Drawing Sheets

|   | j= | | | | | | | | | | | | | | | |
|---|---|---|---|---|---|---|---|---|---|---|---|---|---|---|---|---|
|   | 1 | 2 | 3 | 4 | 5 | 6 | 7 | 8 | 9 | 10 | 11 | 12 | 13 | 14 | 15 | 16 |
|   | R | G | B | R | G | B | R | G | B | R | G | B | R | G | B | R |
| i= 1 | 1 | 2 | 3 | 3 | 4 | 5 | 6 | 6 | 1 | 2 | 3 | 3 | 4 | 5 | 6 | 6 |
| 2 | 2 | 3 | 4 | 4 | 5 | 6 | 1 | 1 | 2 | 3 | 4 | 4 | 5 | 6 | 1 | 1 |
| 3 | 3 | 4 | 5 | 5 | 6 | 1 | 2 | 2 | 3 | 4 | 5 | 5 | 6 | 1 | 2 | 2 |
| 4 | 4 | 5 | 6 | 6 | 1 | 2 | 3 | 3 | 4 | 5 | 6 | 6 | 1 | 2 | 3 | 3 |
| 5 | 5 | 6 | 1 | 1 | 2 | 3 | 4 | 4 | 5 | 6 | 1 | 1 | 2 | 3 | 4 | 4 |
| 6 | 6 | 1 | 2 | 2 | 3 | 4 | 5 | 5 | 6 | 1 | 2 | 2 | 3 | 4 | 5 | 5 |
| 7 | 1 | 2 | 3 | 3 | 4 | 5 | 6 | 6 | 1 | 2 | 3 | 3 | 4 | 5 | 6 | 6 |
| 8 | 2 | 3 | 4 | 4 | 5 | 6 | 1 | 1 | 2 | 3 | 4 | 4 | 5 | 6 | 1 | 1 |
| 9 | 3 | 4 | 5 | 5 | 6 | 1 | 2 | 2 | 3 | 4 | 5 | 5 | 6 | 1 | 2 | 2 |
| 10 | 4 | 5 | 6 | 6 | 1 | 2 | 3 | 3 | 4 | 5 | 6 | 6 | 1 | 2 | 3 | 3 |
| 11 | 5 | 6 | 1 | 1 | 2 | 3 | 4 | 4 | 5 | 6 | 1 | 1 | 2 | 3 | 4 | 4 |
| 12 | 6 | 1 | 2 | 2 | 3 | 4 | 5 | 5 | 6 | 1 | 2 | 2 | 3 | 4 | 5 | 5 |

Fig. 3

METHOD FOR THE ORIENTATION OF A PARALLAX BARRIER SCREEN ON A DISPLAY SCREEN

This nonprovisional application is a continuation of International Application No. PCT/DE2007/002135, which was filed on Nov. 26, 2007, and which claims priority to German Patent Application No. 10 2007 026 628.8, which was filed in Germany on Jun. 7, 2007, and which are both herein incorporated by reference.

BACKGROUND OF THE INVENTION

1. Field of the Invention

The invention relates to a method for the orientation of a parallax barrier screen on a display screen.

2. Description of the Background Art

Approaches to the field of parallax barriers have existed for some time. A pioneer in this field was Frederic Ives who in the publication GB 190418672 A proposed a system with a "line screen" for 3-D imaging. Further, fundamental findings on the use of barrier screens for 3-D imaging are described in the publication by Sam H. Kaplan "Theory of parallax barriers," Journal of SMPTE, Vol. 59, No. 7, pp. 11-21, July 1952.

A widespread dissemination of autostereoscopic systems did not succeed for a long time, however. An actual renaissance of 3-D systems did not occur until the eighties of the $20^{th}$ century, because of the now available computing power and novel display technologies. In the 1990s, the number of patent applications and publications for glasses-free 3-D visualizations positively shot up. Outstanding results were achieved by the following inventors or suppliers:

In JP 08331605 AA, Masutani Takeshi et al. describe a step barrier in which a transparent barrier element has approximately the dimensions of a color subpixel (R, G, or B). With this technology, it was possible for the first time to transfer the resolution loss occurring in most autostereoscopic systems in the horizontal direction, due to the representation of simultaneous multiple views (at least two, preferably more than two views), in part also to the vertical direction. A disadvantage here, as in all barrier methods, is the high light loss. In addition, the stereo contrast with sideways movement of the viewer changes from almost 100% to about 50% and then increases again to 100%, which as a result has a fluctuating 3-D image quality within the viewing space.

In German Pat. Appl. No. DE 100 03 326 C2, Armin Grasnick et al. achieved a refinement of the barrier technology in regard to two-dimensional structured wavelength-selective filter arrays to produce a 3-D impression. A disadvantage here as well, however, is the greatly reduced brightness of this type of 3-D systems in comparison with a 2-D display.

Finally, Wolfgang Tzschoppe et al. filed the International Pat. Appl. No. WO 2004/077839 A1, which relates to a barrier technology improved in regard to brightness. Based on the approach of a step barrier disclosed in JP 08331605 AA and DE 100 03 326 C2, a special line-to-space ratio of the transparent to the opaque barrier filter elements is presented here, which is greater than 1/n with n being the number of the displayed views. The embodiments and teaching disclosed in this publication, however, usually produce unpleasant moiré effects and/or a greatly limited depth perception, because the stereo contrast is greatly reduced, compared with, for instance, the teaching of JP 08331605 AA.

In U.S. Pat. Appl. No. 2006/0051109 A1 (Lim et al.), the manufacturing of a 3-D screen is described, in which a 3-D imaging device (e.g., a lens or a barrier screen) is aligned before a screen and then in the correct orientation an adhesive bond is hardened. In this regard, a black stripe is characteristically produced, which is observed by an operator or camera. Of particular disadvantage here is that the required correctness is not necessarily achieved during the aligning with use of a black stripe or a black area alone. The additionally proposed method of using at least one left and one right image with different image contents in each case of a completely white and a completely black area as an alignment test pattern, on the contrary, requires the evaluation of two disjunctive partial images, namely, the left and the right.

German Pat. No. DE 102 52 830 B3 (Maly-Motta) describes an autostereoscopic adapter for a flat panel display, which undergoes automatic calibration via an electro-optic sensor. No statements are made about the test patterns employed thereby, however, so that no conclusions can be drawn on the quality of the final calibration.

SUMMARY OF THE INVENTION

It is therefore an object of the present invention to provide a way for orienting a parallax barrier screen on a display screen to generate a display screen for the three-dimensional representation with simplest means possible, so that a sufficiently precise orientation is realized within a short time.

This object is achieved in an embodiment according to the invention by a method for the orientation of a parallax barrier screen on a display screen with pixels $x(i,j)$ in a pattern of rows (i) and columns (j) to produce a display screen for three-dimensional representation, comprising the following steps: presentation of a test image, which includes different views $A(k)$ with $k=1, \ldots, n$ and $n=6$ or $n=7$, on the pixels $x(i,j)$ with rows (i) and columns (j), whereby the test image comprises at least two first straight lines having two directions of extension different from one another and said lines are each placed at different horizontal positions in $n=6$ or $n=7$ views $A(k)$ and whereby the test image comprises at least two second straight lines, which are each oriented parallel to one of the first lines and which in each case are placed at least the same horizontal positions in the $n=6$ or $n=7$ views $A(k)$; observation of the presented test image through the parallax barrier screen at a defined distance by means of a conventional two-dimensional camera; orientation of the parallax barrier screen in front of the display screen in such a way that in the image, taken by the camera, of the presented test image in each case each first line merges seamlessly into at least one correspondingly placed second line, and that all first and second lines in the image are shown as straight and continuous; so that the orientation of the parallax barrier screen to the display screen with pixels $x(i,j)$ is defined precisely with a tolerance of at most 3 arc minutes with respect to the rotative relative position of the parallax barrier screen to the display screen; and so that the orientation of the parallax barrier screen to the display screen with pixels $x(i,j)$ is defined precisely with a tolerance of at most the width and/or height of a pixel $x(i,j)$ with respect to the horizontal and/or vertical relative position of the parallax barrier screen to the display screen.

The last mentioned orientation of the parallax barrier screen with respect to the horizontal and/or vertical relative position is achieved naturally within the more closely defined tolerance only within recurring periods, which are usually approximately integer multiples of the width or height of a pixel $x(i,j)$, whereby the particular integer multiple is determined by the horizontal or vertical periodicity of the views in the test image.

In other respects, not all first lines need to have paired disjunctive directions of extension, particularly if there are more than two. It is sufficient if the entire group of first lines has at least 2 directions of extension. An equivalent conclusion for the second lines is obtained with the parallel arrangement of the second lines to the first lines.

The orientation step can be carried out in principle manually by an operator or automatically by a robot or optionally even by a combination of an operator and a robot.

The index i addresses the rows and the index j the columns on the pattern of pixels x(i,j).

The number of 6 or 7 views in the test image, on the one hand, permits an efficient test image creation and, on the other, produces a sufficiently good test effect to achieve the correct orientation.

The parameters for the parallax barrier screen can be calculated simply, for example, with the help of the two equations (1) and (2) known from the aforementioned Kaplan article. There are obtained all necessary relations between the distance s, between the pattern of pixels x(i,j) and the parallax barrier screen, the average eye distance in humans set to 65 mm, the viewing distance, the (horizontal) period length of the transparent sections of the barrier, and the stripe width of said transparent sections. Some of the aforementioned publications also provide further design information for parallax barrier screens, which are sufficiently known to the person skilled in the art.

In the method of the invention, there are now advantageously precisely two directions of extension of the first and therefore also of the second lines, which are each perpendicular to one another. It is favorable, furthermore, if, without restriction of generality, the first direction of extension of the first lines is arranged in the direction of the rows (i) of the pixels x(i,j) and the second direction of extension of the first lines in the direction of the columns (j) of the pixels x(i,j). In practice, it has proven effective to use at least one horizontal first line and at least five vertical lines in the test image.

Moreover, it is expedient to design the test image so that in at least one of the n=6 or n=7 views A(k) in each case each first line merges seamlessly into precisely a second line.

In addition, at least one of the n=6 or n=7 views A(k) may have four right angles that are arranged in such a way that a cross-shaped section is formed. Then, after the step of the orientation of the parallax barrier screen in front of the display screen, at least one first line of the first direction of extension and at least one additional first line of the second direction of extension in the image, taken by the camera, of the presented test image are to be within the cross-shaped section formed by the four right angles, whereby the distances of each of these lines to the respective closest neighboring two right angles are substantially equal. The correctness of the orientation is increased further by means of this design.

In most cases, but not always, the image, taken by the camera after the orientation, of the presented test image comprises at least 40% of the pixels of precisely one of the n=6 or n=7 views A(k).

In each case, all first and all second lines preferably have the same color, the color of the first and that of the second lines preferably being different.

To make the method of the invention even more advantageous for industrial use, at least one, preferably all, of the n=6 or n=7 views A(k) contain alphanumeric characters, preferably model or serial numbers and/or identification marks/objects. This makes sure that the right test image is also used for a specific display screen model, for example, when the model number is seen in the image and the operator or robot always compares this model number with that of the current display screen being worked on.

After the orientation of the parallax barrier screen, in addition, another step of storing the image, taken by the camera, of the presented test image is performed, whereby preferably a clear assignment to the physical display screen and/or the parallax barrier screen oriented thereon is made, for example, by naming of the image file, to be stored, for the said image in the form of a serial number of the display screen. In this way, it can be unequivocally demonstrated later that a specific display screen was properly converted to the 3-D state by the attachment and/or orientation of the parallax barrier screen.

Furthermore, the pixels x(i,j) in each case correspond to individual color subpixels (R, G, or B) or clusters of color subpixels (e.g., RG, GB, or RGBR or others) or full color pixels, whereby full color pixels are taken to mean both white-blending structures of RGB color subpixels, therefore RGB triplets, and actual full color pixels depending on the imaging technology, as is common, for instance, in projection screens.

In principle, the parallax barrier screen can be permanently attached to the display screen at a defined distance s after the orientation in front of the display screen. This would then be a permanent modification.

On the contrary, it would also be possible, however, that after the orientation step the parallax barrier screen is not attached to the screen, but that in another step, applied to the parallax barrier screen and/or to the display screen are markers that allow a later oriented attachment of the parallax barrier screen to the display screen, without having to repeat the entire method of the invention at this later point in time.

The display screen can be preferably a color LCD screen, a plasma display, a projection screen, an LED-based display, an OLED-based display, an SED display, or a VFD display.

The parallax barrier screen comprises transparent and opaque sections inclined at an angle a relative to the vertical. It includes a glass substrate, to the back of which the barrier structure is applied.

The barrier structure, on the one hand, can be an exposed and developed photographic film, which is laminated to the back of the glass substrate, whereby preferably the emulsion layer of the photographic film does not face the glass substrate.

Alternatively, the opaque areas of the barrier structure are formed by color printed on the glass substrate. The transparent areas in this case arise simply by the omission of the color on the corresponding areas.

Additional manufacturing methods are known from the state of the art and require no further explanation here.

In the method of the invention, the arrangement of the image section data of the different views A(k) in the presented test image on the pattern of pixels x(i,j) occurs advantageously in a two-dimensional periodic pattern, whereby the period length in the horizontal and vertical direction preferably does not comprise more than 32 pixels x(i,j) in each case. Exceptions to this upper limit of 32 pixels x(i,j) in each case are allowable.

The angle, which spans said horizontal and vertical period length of said two-dimensional periodic pattern as opposite and adjacent sides, should normally correspond substantially to the inclination angle a of the transparent sections on the parallax barrier screen with respect to the vertical.

Advantageously, the parallax barrier screen has means to reduce spurious light reflections, preferably at least one interference optical antireflection coating.

During the later 3-D representation on the display screen with the oriented parallax barrier screen, the views A(k) each correspond to different perspectives of a scene or an object, as in various other 3-D reproduction methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows an exemplary image combination of the image section data of different views in the test image.

DETAILED DESCRIPTION

The drawings are not to scale. This refers in particular also to the angular dimensions.

Figure 1:
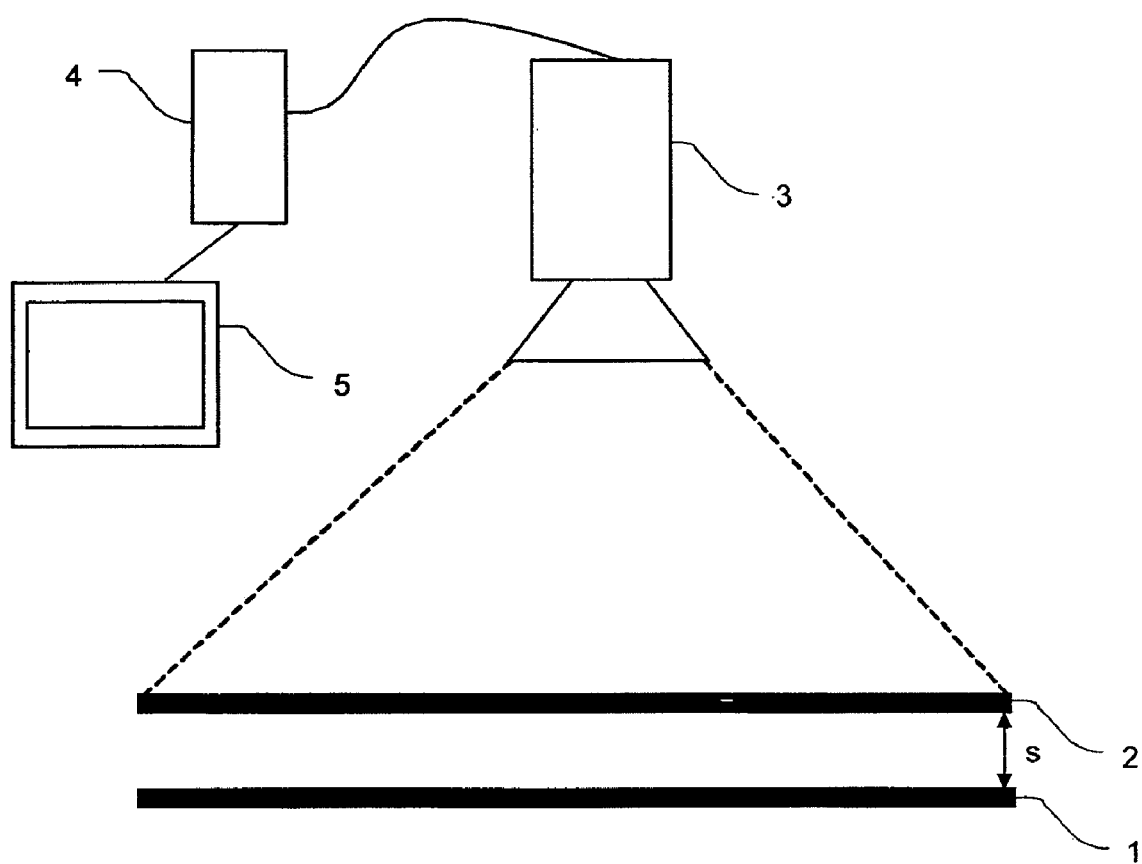
FIG. 1 shows the schematic structure for realizing the method of the invention.

FIG. 1 shows the schematic structure for realizing the method of the invention. In this case, parallax barrier screen 2 is oriented at the distance s on a display screen 1 with pixels x(i,j) in a pattern having rows (i) and column (j), as a result of which a display screen for three-dimensional representation arises. Furthermore, a (usually two-dimensional) camera 3 is seen, whose output signal is supplied here by way of example by means of a frame grabber card in a PC 4, which converts this signal and in turn displays it on a control monitor 5.

According to an embodiment of the invention, the following steps can be performed: presentation of a test image, which includes different views A(k) with k=1, n and n=6, on the pixels x(i,j) with rows (i) and columns (j), whereby the test image comprises at least two first straight lines having two directions of extension different from one another and said lines are each arranged at different horizontal positions in n=6 or n=7 views A(k) and whereby the test image comprises at least two second straight lines, which are each oriented parallel to one of the first lines and which in each case are arranged at least the same horizontal positions in the n=6 or n=7 views A(k); observation of the presented test image through parallax barrier screen 2 at a defined distance by means of a two-dimensional camera 3; orientation of parallax barrier screen 2 in front of the display screen 1 in such a way that in the image, taken by the camera 3, of the presented test image in each case each first line merges seamlessly into at least one correspondingly arranged second line, and that all first and second lines in the image are shown as straight and continuous; so that the orientation of parallax barrier screen 2 to display screen 1 with pixels x(i,j) is defined precisely with a tolerance of at most 3 arc minutes with respect to the rotative relative position of parallax barrier screen 2 to display screen 1; and/or so that the orientation of parallax barrier screen 2 to display screen 1 with pixels x(i,j) is defined precisely with a tolerance of at most the width and/or height of a pixel x(i,j) with respect to the horizontal and/or vertical relative position of parallax barrier screen 2 to display screen 1.

The orientation step is carried out, for example, manually by an operator.

Camera 3 is preferably arranged at a distance in front of parallax barrier screen 2, which corresponds to a selected 3-D viewing distance in front of screen 1. Said distance is usually determined, as is known to the person skilled in the art, by the distance s between display screen 1 and parallax barrier screen 2 in conjunction with other parameters, which are listed, for example, in the aforementioned publication by Kaplan. Preferably, in this case, camera 3 is positioned optically perpendicular before the center of display screen 1.

Figure 2:
FIG. 2 shows an exemplary barrier structure of a parallax barrier screen for use in the method of the invention.

FIG. 2 shows an exemplary barrier structure of a parallax barrier screen 2 for use in the method of the invention. Parallax barrier screen 2 comprises transparent and opaque sections inclined at an angle a relative to the vertical. It includes a glass substrate, to the back of which the barrier structure is applied. Other embodiments are possible, such as, for instance, substrates that do not have glass (e.g., are made of plastic).

The barrier structure here is, for example, an exposed and developed photographic film, which is laminated to the back of the glass substrate, whereby preferably the emulsion layer of the photographic film does not face the glass substrate.

Further, FIG. 3 shows an exemplary image combination of the image section data of different views in the test image, which is represented on the pixels x(i,j). In the method of the invention, the arrangement of the image section data of different views A(k) in the presented test image on the pattern of pixels x(i,j) occurs advantageously in a two-dimensional periodic pattern.

The angle, which spans said horizontal and vertical period length of said two-dimensional periodic pattern as opposite and adjacent sides, should normally correspond substantially to the inclination angle a of the transparent sections on parallax barrier screen 2 with respect to the vertical. Advantageously, parallax barrier screen 2 has means to reduce spurious light reflections, preferably at least one interference optical antireflection coating.

Figure 4:
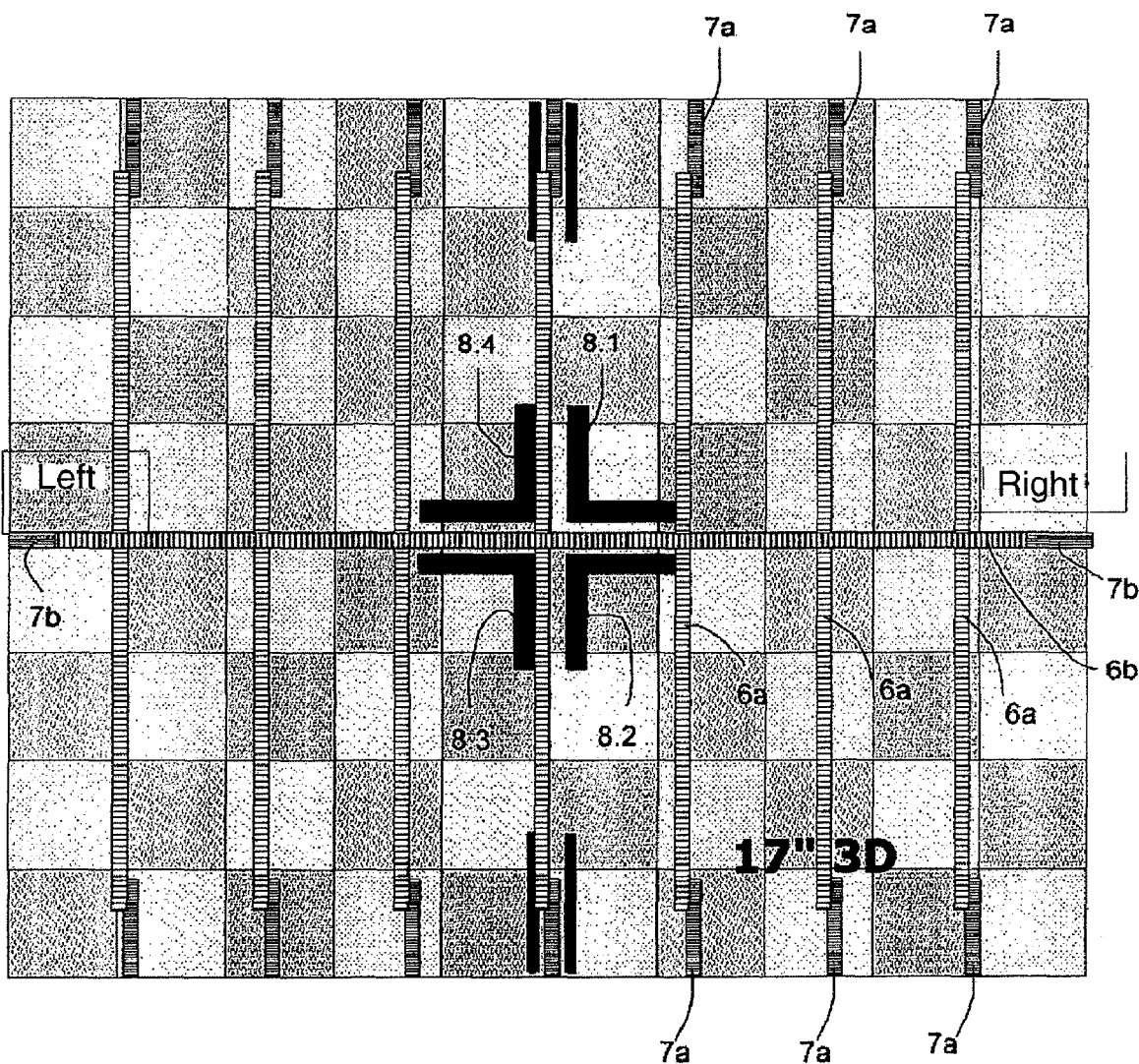
FIG. 4 to FIG. 6 show view examples for individual views A(k), whose image section data are depicted in the presented test image.
Figure 5:
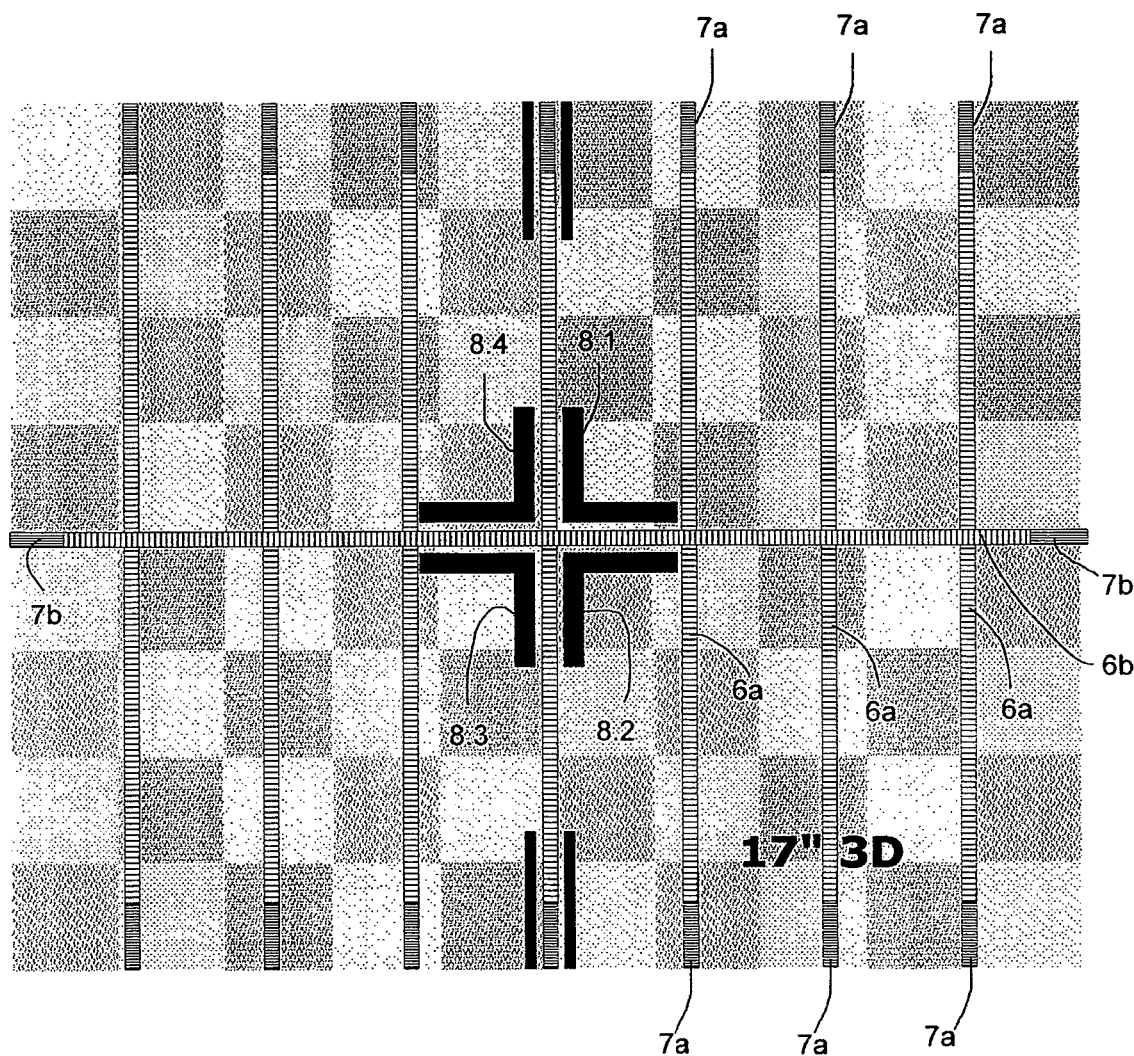
Figure 6:
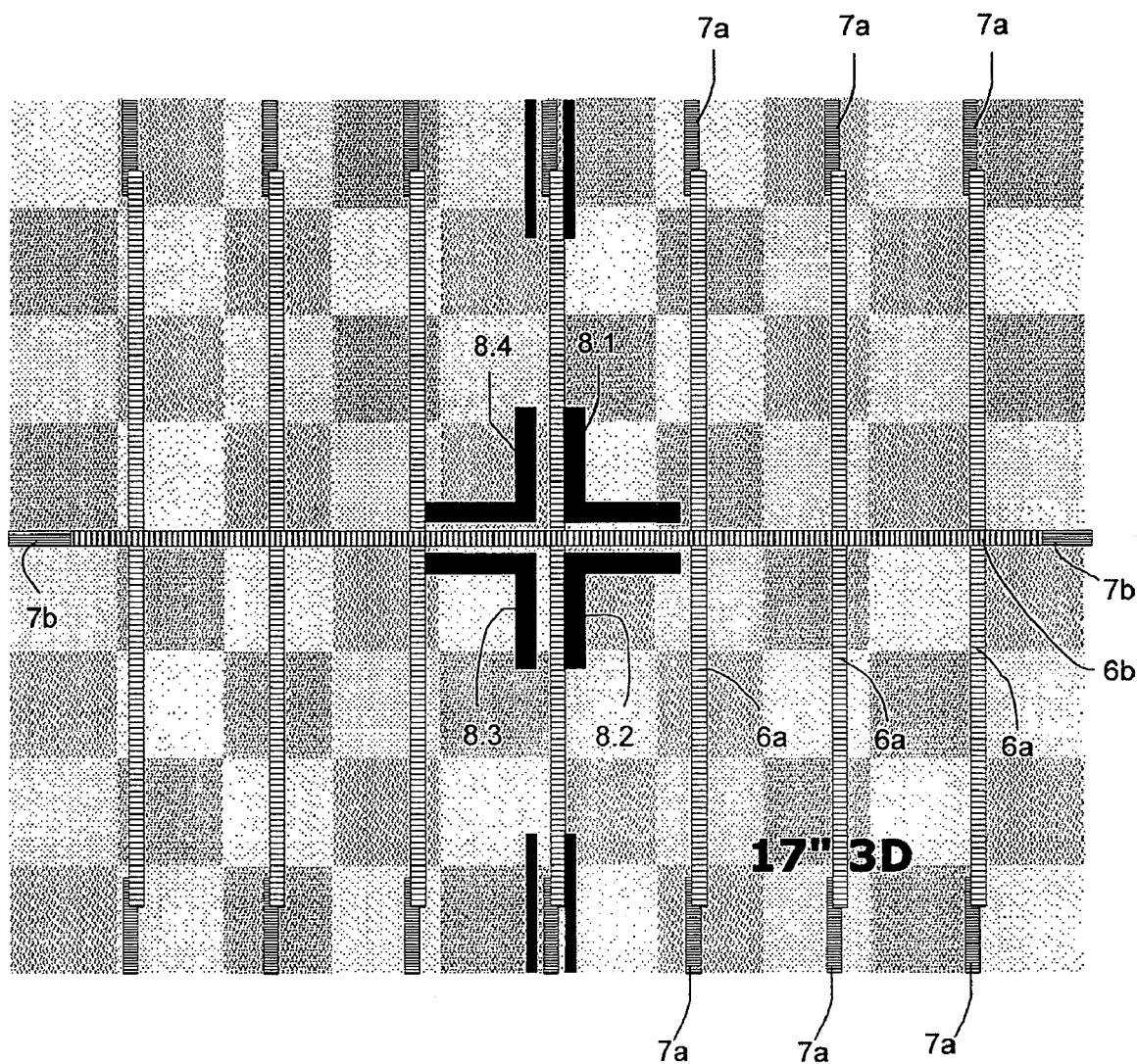

Furthermore, FIG. 4 to FIG. 6 show view examples for individual views A(k) with k=1, k=3, and k=5, whose image section data are displayed in the presented test image.

At least two first straight lines 6a, 6b are seen, which have two directions of extension different from one another. These lines are placed at different horizontal positions in the n=6 views A(k). The test image comprises further at least two second straight lines 7a, 7b, each of which is oriented parallel to one of the first lines 6a, 6b and which in each case are placed at least the same horizontal positions in the n=6 views A(k).

The first lines 6a and 6b here are each advantageously arranged perpendicular to one another, as is evident from FIGS. 4 to 6. It is favorable, furthermore, if, without restriction of generality, the first lines 6b are arranged in the direction of the rows (i) of the pixels x(i,j) and the first lines 6a in the direction of the columns (j) of the pixels x(i,j). In practice, it has proven effective to use at least one horizontal first line 6b and at least five vertical first lines 6a in the test image.

Moreover, it is expedient to design the test image so that in at least one of the n=6 views A(k) in each case each first line 6a, 6b merges seamlessly into precisely one or a maximum of two second lines 7a, 7b, here according to FIG. 5.

For the case that parallax barrier display screen 2 is oriented correctly in front of display screen 1, the image, taken by camera 3, of the presented test image should look approximately like the view k=3 in FIG. 5. In the case of an incorrect orientation with respect to the rotative relative position of parallax barrier screen 2 to display screen 1, the first lines 6a, 6b in particular do not have a straight appearance, but rather appear interrupted or with jagged edges. This would be a sign for continuing the orientation with a further rotative change of said relative position.

In the case of an incorrect orientation with respect to the horizontal and/or the vertical relative position of parallax barrier screen 2 to display screen 1, all first lines 6a, 6b do not merge seamlessly into the corresponding second lines 7a, 7b in a single case. This would be a sign to move parallax barrier screen 2 horizontally and/or vertically in front of display screen 1, to finally reach a correct position.

As is evident from FIG. 4 to FIG. 6, in addition, all of the n=6 views A(k) have four right angles 8.1, 8.2, 8.3, and 8.4, which by their arrangement form a cross-shaped section. After the step of orienting parallax barrier screen 2 in front of display screen 1, at least two first lines 6a, 6b in the image, taken by camera 3, of the presented test image should be within the formed cross-shaped section, whereby the distances of all first lines 6a, 6b to the respective closest neighboring two right angles (e.g., right angle 8.1 to right angle 8.2 or to right angle 8.4) are substantially the same. The correctness of the orientation of parallax barrier screen 2 in front of display screen 1 is increased further by this design.

In each case, all first and all second lines 6a, 6b, 7a, 7b preferably have the same color, the color of the first lines 6a, 6b and that of the second lines 7a, 7b preferably being different. In the drawings in FIG. 4 to FIG. 6, the colors are indicated by the different patterns.

To make the method of the invention even more advantageous for industrial use, at least one, preferably all, of the n=6 views A(k) contain alphanumeric characters, preferably model or serial numbers and/or identification marks/objects. This makes sure that the correct test image is used for a specific display screen model. For instance, in FIGS. 4 to 6 the writing "17" 3D" can be seen.

After the orientation of parallax barrier screen 2, in addition, another step of storing the image, taken by camera 3, of the presented test image can be performed, whereby preferably a clear assignment to the physical display screen 1 and/or parallax barrier screen 2 oriented thereon is made, for example, by naming the image file to be saved for said image in the form of a serial number of display screen 1.

In the exemplary embodiment, parallax barrier screen 2 is attached permanently to display screen 1 by means of a spacer element to preserve the distance s defined above, for example, glued or screwed on.

Display screen 1 preferably may be a color LCD screen.

During the later 3-D representation on display screen 1 with oriented parallax barrier screen 2, the views A(k) each correspond to different perspectives of a scene or an object, as in various other 3-D reproduction methods.

For further illustration of possible realizations of the method of the invention, additional exemplary details and parameters are indicated hereinafter.

In a first embodiment, an LCD screen of the type NEC LCD4010, measuring an image diagonal of about 40", is used as display screen 1 and is equipped with color subpixels R, G, B as pixels x(i,j) in a pattern (i,j) with a resolution of rows i=1, . . . , 768 and columns j=1, . . . , 1360*3=4080, whereby image section data of different views A(k) with k=1, . . . , n and n=6 can be made visible on the pixels x(i,j), therefore also a suitable test image with the properties described heretofore. In the example, the color subpixels (R, G, B), as is known, correspond to the pixels x(i,j), whereby in each case their height is about 0.648 mm and their width about 0.216 mm.

Figure 7:
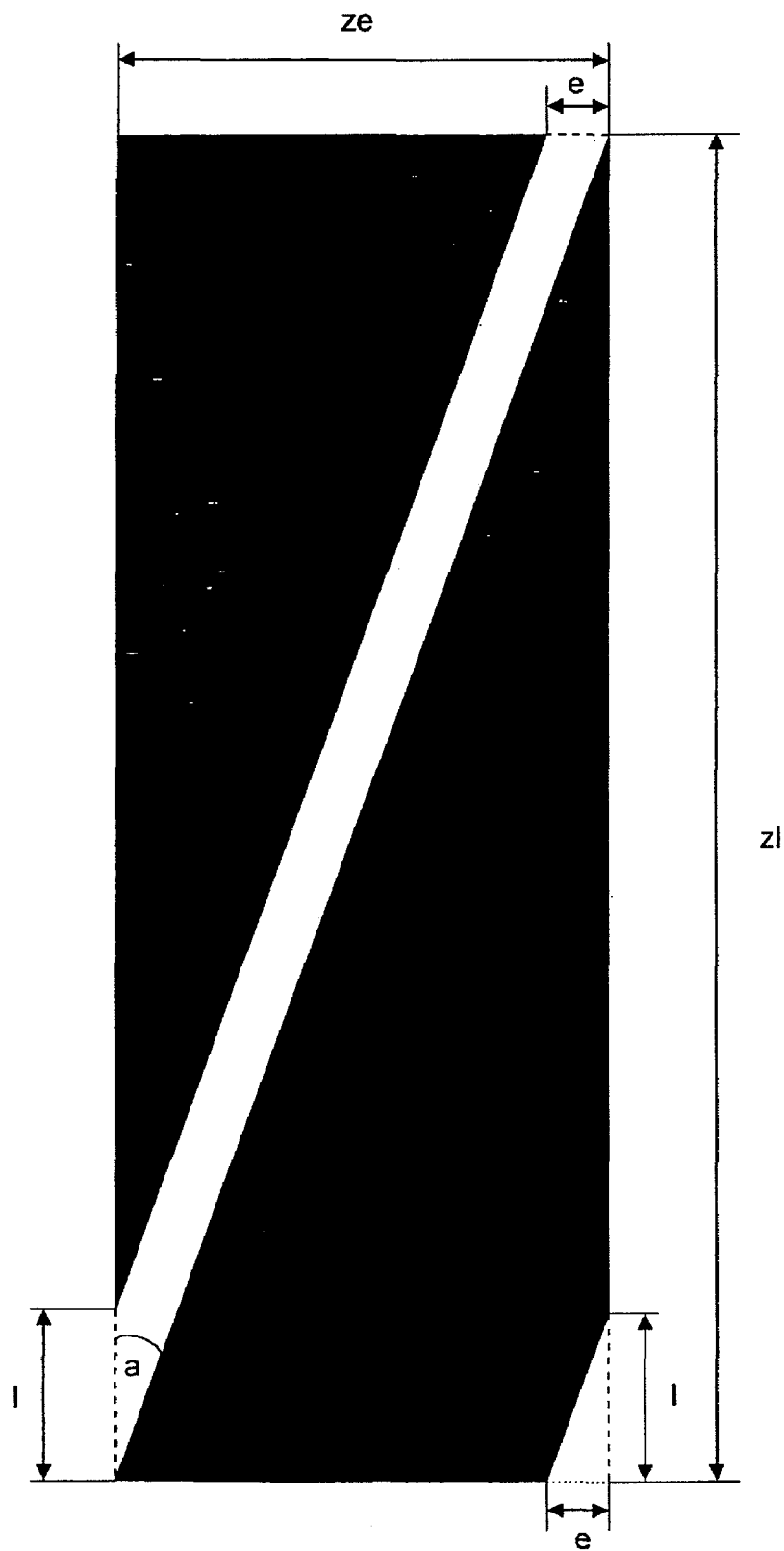
FIG. 7 shows a diagram for dimensioning a parallax barrier screen.

According to the dimensioning in FIG. 7, the transparent sections of parallax barrier screen 2 are at an inclination angle a=23.96248897° with respect to the vertical. The width e of said sections in the horizontal direction of the pattern with the pixels x(i,j) is 0.4305692 mm and its height l is 0.968781 mm. The horizontal period ze is 1.7222768 mm and the vertical period zl of the transparent sections is 3.875124 mm.

In a second embodiment, a 32" LCD screen of the type NEC LCD3210 is used instead of the 40" LCD screen.

Here as well, the color subpixels (R, G, B) are used as pixels x(i,j). In this case, a resolution of rows i=1, . . . , 768 and column j=1, . . . , 1360*3=4080 is also provided, whereby the height of the pixels x(i,j) is about 0.511 mm and the width about 0.17033 mm, the image section data of the different views A(k) of the test image are arranged according to FIG. 3, the inclination angle a of the transparent sections of parallax barrier screen 2 with respect to the vertical is 23.96248897°, and the width e of said sections in the horizontal direction of the pattern with the pixels x(i,j) is 0.339776 mm and its height 10.764496 mm.

The horizontal period ze is 1.359104 mm and the vertical period zl of the transparent sections is 3.057984 mm (compare FIG. 7).

It should be noted that the LCD screens NEC LCD3210 and NEC LCD4010 have in fact natively 1366*3 pixels in the horizontal, but for the pixel-precise control usually only 1360*3=4080 horizontal pixels, i.e., color subpixels R, G, B, may be used.

In a third exemplary embodiment, a 17" LCD screen of the type BenQ FP72E is used.

Here as well, the color subpixels (R, G, B) are used as pixels x(i,j). In this case, a resolution of rows i=1, . . . , 1024 and columns j=1, . . . , 1280*3=3840 is also provided, whereby the height of the pixels x(i,j) is about 0.264 mm and the width about 0.088 mm, the image section data of the different views A(k) of the test image are arranged according to FIG. 3, the inclination angle a of the transparent sections of parallax barrier screen 2 with respect to the vertical is 23.96248897°, and the width e of said sections in the horizontal direction of the pattern with the pixels x(i,j) is 0.175762 mm and its height 10.3954645 mm.

The horizontal period ze is 0.703048 mm and the vertical period zl of the transparent sections is 1.581858 mm (see FIG. 7).

The advantages of the invention are multifaceted. In particular, the method of the invention permits the orientation of a parallax barrier screen on a display screen to produce a display screen for three-dimensional representation in a relatively short time and with high precision. It can be used further by means of appropriate test images for display screens of various sizes, in this respect therefore very flexibly. Moreover, said orientation can be implemented manually, automatically, or semiautomatically. The invention can be realized with simple and customary means.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the orientation of a parallax barrier screen on a display screen with pixels x(i,j) in a pattern of rows (i) and columns (j) to produce a display screen for three-dimensional representation, the method comprising:

presenting a test image having different views A(k) with k=1, n and n=6 or n=7, on the pixels x(i,j) with rows (i)

and columns (j), the test image comprising at least two first straight lines having two directions of extension different from one another and the first lines each being placed at different horizontal positions in n=6 or n=7 views, wherein the test image comprises at least two second straight lines, which are each oriented parallel to one of the first lines and which in each view are placed at least the same horizontal positions in the n=6 or n=7 views A(k);

observing the presented test image through the parallax barrier screen at a defined distance by a two-dimensional camera;

orientating the parallax barrier screen in front of the display screen such that in an image taken by the camera of the presented test image in each view each first line merges seamlessly into at least one correspondingly placed second line, and that all first and second lines in the image are shown as straight and continuous so that the orientation of the parallax barrier screen to the display screen with pixels x(i,j) is defined precisely with a tolerance of at most 3 arc minutes with respect to the rotative relative position of the parallax barrier screen to the display screen and so that the orientation of the parallax barrier screen to the display screen with pixels x(i,j) is defined precisely with a tolerance of at most the width and/or height of a pixel x(i,j) with respect to the horizontal and/or vertical relative position of the parallax barrier screen to the display screen.

2. The method according to claim 1, wherein the at least two first lines are each arranged perpendicular to one another.

3. The method according to claim 2, wherein at least one of the n=6 or n=7 views A(k) has four right angles that by their arrangement form a cross-shaped section, and that after the step of the orientation of the parallax barrier screen in front of the display screen, at least two first lines in the image, taken by the camera, of the presented test image are within the cross-shaped section formed by the right angles, and wherein the first lines are substantially parallel to the adjacent branches of the right angles and have the same distance.

4. The method according to claim 1, wherein the first lines are arranged in the direction of the rows (i) of the pixels x(i,j) and the first lines in the direction of the columns (j) of the pixels x(i,j).

5. The method according to claim 1, wherein in at least one of the n=6 or n=7 views A(k) each first line merges seamlessly into precisely one or a maximum of two second lines.

6. The method according to claim 1, wherein the image, taken by the camera after the orientation of the presented test image comprises at least 40% of the pixels of precisely one of the n=6 or n=7 views A(k).

7. The method according to claim 1, wherein in each view all first lines and all second lines are provided with the same color, whereby the color of the first lines and that of the second lines are preferably different.

8. The method according to claim 1, wherein alphanumeric characters, such as model or serial numbers and/or identification marks/objects are incorporated into at least one of the n=6 or n=7 views A(k).

9. The method according to claim 1, wherein after the orientation of the parallax barrier screen, another step of storing the image taken by the camera of the presented test image is performed, wherein a clear assignment to the physical display screen and/or parallax barrier screen oriented thereon is made by naming the image file to be stored for the image in the form of a serial number of the display screen.

10. The method according to claim 1, wherein the pixels x(i,j) correspond to color subpixels or clusters of color subpixels or full color pixels.

11. The method according to claim 1, wherein the parallax barrier screen is permanently attached to the display screen at a defined distance after the orientation in front of the display screen.

12. The method according to claim 1, wherein after the orientation step the parallax barrier screen is not attached to the display screen, but that in another step, applied to the parallax barrier screen and/or to the display screen are markers that allow a later oriented attachment of the parallax barrier screen to the display screen without having to repeat the entire method of the invention at this later point in time.

13. The method according to claim 1, wherein a color LCD screen, a plasma display, a projection screen, an LED-based display, an OLED-based display, an SED display, or a VFD display is used as the display screen.

14. The method according to claim 1, wherein the parallax barrier screen comprises transparent and opaque sections inclined at an angle relative to the vertical.

15. The method according to claim 1, wherein the parallax barrier screen has a glass substrate to the back of which a barrier structure is applied.

16. The method according to claim 15, wherein the barrier structure is an exposed and developed photographic film, which is laminated to the back of the glass substrate, wherein an emulsion layer of the photographic film does not face the glass substrate.

17. The method according to claim 15, wherein the opaque areas of the barrier structure are formed by color printed on the glass substrate.

18. The method according to claim 1, wherein the parallax barrier screen reduces spurious light reflections, preferably at least one interference optical antireflection coating.

19. The method according to claim 1, wherein the display screen is a 17" LCD screen with color subpixels as pixels x(i,j), wherein the height of the pixels x(i,j) is about 0.264 mm and the width about 0.088 mm, the image section data of different views A(k) in the presented test image are arranged as follows,

| x (i,j) | 1 | 2 | 3 | 4 | 5 | 6 | 7 | 8 | 9 | ... |
|---|---|---|---|---|---|---|---|---|---|---|
| 1 | A(1) | A(2) | A(3) | A(3) | A(4) | A(5) | A(6) | A(6) | A(1) | ... |
| 2 | A(2) | A(3) | A(4) | A(4) | A(5) | A(6) | A(1) | A(1) | A(2) | ... |
| 3 | A(3) | A(4) | A(5) | A(5) | A(6) | A(1) | A(2) | A(2) | A(3) | ... |
| 4 | A(4) | A(5) | A(6) | A(6) | A(1) | A(2) | A(3) | A(3) | A(4) | ... |
| 5 | A(5) | A(6) | A(1) | A(1) | A(2) | A(3) | A(4) | A(4) | A(5) | ... |
| 6 | A(6) | A(1) | A(2) | A(2) | A(3) | A(4) | A(5) | A(5) | A(6) | ... |
| 7 | A(1) | A(2) | A(3) | A(3) | A(4) | A(5) | A(6) | A(6) | A(1) | ... |
| ... | ... | ... | ... | ... | ... | ... | ... | ... | ... | ..., | wherein transparent sections of the parallax barrier screen have an inclination angle a=23.96248897° with respect to the vertical, the width e of said sections in the row direction of the pattern with the pixels x(i,j) is 0.175762 mm in each view and its height l=0.3954645 mm, and wherein the horizontal period of the transparent sections is ze=0.703048 mm and the vertical period zl=1.581858 mm.

20. The method according to claim 1, wherein the display screen is a 32" LCD screen with color subpixels (R, G, B) as pixels x(i,j), wherein the height of the pixels x(i,j) is 0.511 mm and the width 0.17033 mm, wherein the image section data of different views A(k) in the presented test image are arranged as follows,

| x (i,j) | 1 | 2 | 3 | 4 | 5 | 6 | 7 | 8 | 9 | ... |
|---|---|---|---|---|---|---|---|---|---|---|
| 1 | A(1) | A(2) | A(3) | A(3) | A(4) | A(5) | A(6) | A(6) | A(1) | ... |
| 2 | A(2) | A(3) | A(4) | A(4) | A(5) | A(6) | A(1) | A(1) | A(2) | ... |
| 3 | A(3) | A(4) | A(5) | A(5) | A(6) | A(1) | A(2) | A(2) | A(3) | ... |
| 4 | A(4) | A(5) | A(6) | A(6) | A(1) | A(2) | A(3) | A(3) | A(4) | ... |
| 5 | A(5) | A(6) | A(1) | A(1) | A(2) | A(3) | A(4) | A(4) | A(5) | ... |
| 6 | A(6) | A(1) | A(2) | A(2) | A(3) | A(4) | A(5) | A(5) | A(6) | ... |
| 7 | A(1) | A(2) | A(3) | A(3) | A(4) | A(5) | A(6) | A(6) | A(1) | ... |
| ... | ... | ... | ... | ... | ... | ... | ... | ... | ... | ..., | wherein transparent sections of the parallax barrier screen have an inclination angle $a=23.96248897°$ with respect to the vertical, the width e of the sections in the row direction of the pattern with the pixels $x(i,j)$ is 0.339776 mm in each view and its height $l=0.764496$ mm, and wherein the horizontal period of the transparent sections is $ze=1.359104$ mm and the vertical period $zl=3.057984$ mm.

21. The method according to claim 1, wherein the display screen is a 40" LCD screen with color subpixels (R, G, B) as pixels $x(i,j)$, wherein the height of the pixels $x(i,j)$ is about 0.648 mm and the width about 0.216 mm, the image section data of different views $A(k)$ in the presented test image are arranged as follows,

| x (i,j) | 1 | 2 | 3 | 4 | 5 | 6 | 7 | 8 | 9 | ... |
|---|---|---|---|---|---|---|---|---|---|---|
| 1 | A(1) | A(2) | A(3) | A(3) | A(4) | A(5) | A(6) | A(6) | A(1) | ... |
| 2 | A(2) | A(3) | A(4) | A(4) | A(5) | A(6) | A(1) | A(1) | A(2) | ... |
| 3 | A(3) | A(4) | A(5) | A(5) | A(6) | A(1) | A(2) | A(2) | A(3) | ... |
| 4 | A(4) | A(5) | A(6) | A(6) | A(1) | A(2) | A(3) | A(3) | A(4) | ... |
| 5 | A(5) | A(6) | A(1) | A(1) | A(2) | A(3) | A(4) | A(4) | A(5) | ... |
| 6 | A(6) | A(1) | A(2) | A(2) | A(3) | A(4) | A(5) | A(5) | A(6) | ... |
| 7 | A(1) | A(2) | A(3) | A(3) | A(4) | A(5) | A(6) | A(6) | A(1) | ... |
| ... | ... | ... | ... | ... | ... | ... | ... | ... | ... | ..., | wherein transparent sections of the parallax barrier screen have an inclination angle $a=23.96248897°$ with respect to the vertical, the width e of said sections in the row direction of the pattern with the pixels $x(i,j)$ is 0.4305692 mm in each view and its height $l=0.968781$ mm, and wherein the horizontal period of the transparent sections is $ze=1.7222768$ mm and the vertical period $zl=3.875124$ mm.

\* \* \* \* \*